United States Patent [19]
Morgan

[11] 3,823,691
[45] July 16, 1974

[54] ANIMAL TRAINING DEVICE

[76] Inventor: Marshall M. Morgan, 10819 Chimney Rock, Houston, Tex. 77035

[22] Filed: May 10, 1973

[21] Appl. No.: 358,928

[52] U.S. Cl. .............................................. 119/29
[51] Int. Cl. ............................................ A01k 15/00
[58] Field of Search ........ 119/29, 96, 106; 325/118, 325/119, 361, 364

[56] References Cited
UNITED STATES PATENTS
3,608,524  9/1971  Waltz ................................... 119/29
3,753,421  8/1973  Peck ..................................... 119/29

Primary Examiner—Antonio F. Guida
Assistant Examiner—J. N. Eskovitz
Attorney, Agent, or Firm—Donald Gunn

[57] ABSTRACT

An apparatus useful in breaking dogs from barking, incorporating a microphone, threshold detecting circuit which senses a bark or other noise from the dog of suitable amplitude and duration, an oscillator providing an output frequency sufficiently high that human ears cannot hear it, a mixer circuit where the oscillator frequency is modulated by the bark, and a filter circuit which rejects low frequency components of the mixed signal to avoid annoying humans, and a power output amplifier connected to a speaker. The threshold detector controls the application of power to the output amplifier. When the device operates, the dog's bark modulates the higher frequency tone which is annoying to the dog, and the dog soon learns that the barking is punished by the high frequency sound. The silence of the dog is rewarded by termination of the high frequency sound. A switch override provides continuous output of tone.

9 Claims, 1 Drawing Figure

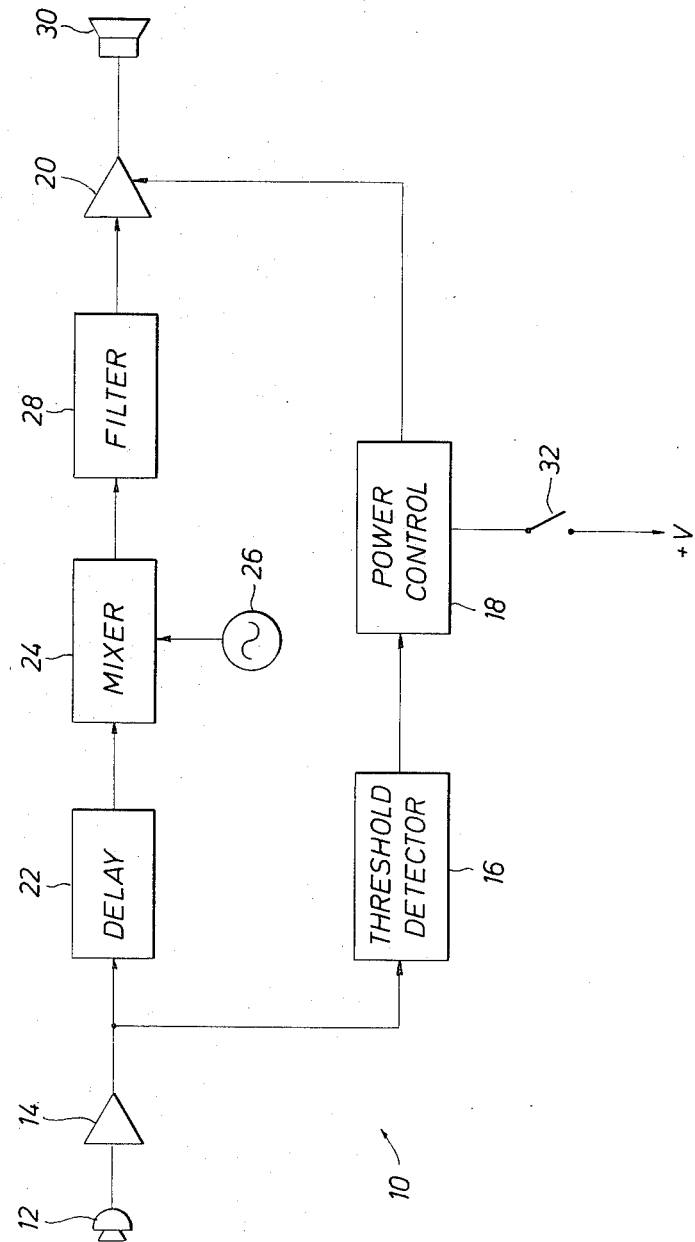

ANIMAL TRAINING DEVICE

BACKGROUND OF THE INVENTION

Barking dogs are problems in many circumstances. Dogs who bark profusely are viewed by their owners with exasperation, and by their neighbors with outright annoyance. The difficulty in breaking a dog of barking is that it normally requires consistent conduct on behalf of the party wishing to discipline the dog. It is difficult to provide consistency at all hours of the day and night. Hence, the training device is provided. The above references show devices which are generally unusable in breaking a barking dog. The present invention is a monitor which can be left in operation at all times. It can be used discretely by an individual who has a neighbor with a barking dog. Once the bark is suppressed, the device can be moved. Animal lovers have no room to complain in that a disciplined dog is believed to be happier than an unruly or ill-mannered animal.

SUMMARY OF THE INVENTION

The present invention incorporates a microphone which listens for a dog's bark, a threshold detector circuit which selects those barks or noises from the dog which are of sufficient time and duration to be considered annoysome. and a power control operated by the threshold detector circuit. The apparatus further includes an oscillator tuned to a frequency beyond the range of the human ear. The circuit further includes a mixer receiving the amplified signal of the dog's bark, and the oscillator output. The two are mixed and filtered for the higher components which are then provided to a power output amplifier whose operation is controlled by the power control. When power is provided, an output signal is formed which is a high frequency tone modulated by the dog's bark. If desired, a delay circuit can be included. Additionally, an unmodulated tone can be broadcast subject to operator control.

DESCRIPTION OF THE DRAWINGS

The single view is a block diagram schematic of the circuit of the present invention.

DESCRIPTION OF THE PREFERRED EMBODIMENT

The dog training device is indicated in general at 10. It incorporates a microphone 12 which is preferably a directional microphone. It preferably includes a sensitive element which is frequency limited to the frequency range of barking dogs. It is preferably not responsive to frequencies above a specified level, say 2,500 hertz or so. The microphone 12 is preferably directed so that it can be aimed or focused in the vicinity of a dog. The directional nature also assists in making the device non-responsive to extraneous noises occurring in other directions.

A pre-amp 14 is connected to the microphone. It increases the voltage level to a suitable level for cooperation with the other circuit components. The output of the amplifier 14 goes to a threshold detector circuit 16. The circuit 16 tests for noises of sufficient magnitude and duration. The threshold detector will not respond to an extremely loud noise of an extremely short duration. It responds to noises which have a duration of a set amount, which can be adjusted. One suitable response is to noises of duration of greater than one-half second. The level or intensity is relative and will vary dependent upon the noise level in the vicinity, the size of the dog, and other factors. The threshold detector forms an output signal for a power control 18. The power control 18 controls or regulates the application of power to an output amplifier 20. The threshold detector forms an enabling signal for the power control. The enabling signal is applied to the power control circuit and suitable B+ voltage is applied to the amplifier 20. The power control preferably provides power to the amplifier for a range of time measured in seconds. While the signal applied from the threshold detector 16 may be short, the power control 18 preferably stretches or holds the output in the range of about 5 to 10 seconds. This enables the amplifier 20 to function.

A delay circuit 22 provides a relatively short delay, perhaps in the range of one-half second or more. It can be omitted as desired. The preferred embodiment utilizes the delay to tailor the output noise of the apparatus so the dog hears what seems to be an echo of his bark. Excessive delay may so separate the echo from the bark that the dog may not associate the two. The absence of delay will superimpose the output of the present invention on the bark with the only time lag arising from the time required for the sound to travel from the dog to the present invention and back, an interval which is too short to be observed by human or animal systems. The delay circuit 22 forms a delayed output which is supplied to a mixing circuit 24. It serves as a modulating circuit wherein a carrier provides from an oscillator 26 is modulated with the signal representative of the dog's bark. The signals are mixed and then supplied to a filter 28 which then connects with the power amplifier 20. The amplified output is provided over a speaker 30. The speaker 30 is preferably directional and is focused in the same general vicinity as the microphone 12. An override switch 32 controls continuous amplifier operation. The user can operate it for special occasions.

Several factors about the operation of the present invention should be noted. The dog's bark is comprised of significant low frequency content. The high frequency content is not critical. The apparatus of the present invention does not need to provide the highest fidelity in reproduction of the dog's bark. The loss of high frequency content and phase shift among the various harmonics of the dog's bark are of no particular consequence. The relative amplitude and frequency of the fundamental and perhaps the first and second harmonics are more significant than the other factors of the complex wave form of the dog's bark. The loss of the finer components in the wave form are of no particular concern.

In operation, when the device is used, it is preferably installed with the microphone 12 and speaker 30 focused or aimed in a common direction. The device is activated and left on. It is preferably tuned at the threshold detector so whimpering noises and the like from the dog are of no concern. It is tuned so that noises of short duration do not trigger operation. Once installed, it is left in an untended condition and operates continuously. When the dog barks, the device returns an echo to the dog which is of a frequency so high the human ear cannot hear it. The frequency is in the audio range of the dog. This annoys the dog, tending to punish him for barking. When this occurs, the barking will cease.

The delay circuit 22 can be omitted as desired. Its inclusion enables the threshold detector 16 to complete its operation and enables the echo to include the entirety of the dog's bark. Many dogs, when barking, tend to bark repetitively without interruption. The device can simply function without the inclusion of the delay circuitry inasmuch as clipping of the front portion of the echo provided by the present invention does not seriously detract from the fidelity of the echo of the barking.

The filter 28 preferably rejects frequencies below the oscillator frequency, or below about 20,000 hertz. This keeps the device from annoying humans who might have acute hearing capabilities in higher frequency ranges. If the power control maintains power to the power output amplifier 20 for a specified period, the later portions of the period may be characterized by an absence of modulating bark. Notwithstanding this, the device continues to output the signal from the oscillator 26 without modulation. This serves as a type of added punishment for the dog in that the duration of the bark may be stretched to a selected minimum value. If the dog barks for about three seconds, and the power control operates for a selected period of about 6 seconds, and the output from the device will last about 6 seconds. This tends to reinforce the punative nature of the echo provided to the dog. It is believed that this does not detract from operation of the equipment. In like manner, continued operation subject to the switch 32 can be used as punishment.

The apparatus can be hand-held. All of the components can be formed of integrated circuits and incorporated in a relatively small structure. The only limitation from a hand-held device are the requisite limitations on power output at the speaker 30. However, inasmuch as the output content is extremely high frequency, a smaller speaker will normally handle the power levels under consideration. If desired, the delay circuit can be omitted in a portable model. Delay circuits tend to increase costs and their omission will reduce the cost of manufacture. The apparatus can be formed into a cabinet or housing shaped somewhat like a large flashlight, focusing both the microphone 12 and the speaker 30 at or along a particular axis. The power control 18 is preferably a relay which controls power to the amplifier 20. Stretching of its operation can be achieved by use of a storage capacitor maintaining operative voltage to the relay.

The scope of the present invention is determined by the claims which are appended hereto.

I claim:

1. A dog training apparatus which returns a dog's bark, comprising:
   a microphone which listens for a dog's bark;
   a high frequency oscillator;
   an output amplifier connected to said oscillator;
   an output speaker connected to said amplifier for forming an output sound with high frequency content; and,
   circuit means connected to said microphone for actuating the formation of an output sound from said speaker for a selected interval upon the detection of sound waves emitted from said dog's bark.

2. The apparatus of claim 1 wherein said microphone is frequency limited and directional.

3. The apparatus of claim 1 wherein said microphone is connected to a mixer circuit and said mixer circuit is between said oscillator and said amplifier.

4. The apparatus of claim 1 wherein said output amplifier is controlled in operation by a control circuit means which determines the interval of operation.

5. The apparatus of claim 1 wherein said speaker is directional and forms sounds at levels about the audio range of humans and in the audio range of dogs.

6. The apparatus of claim 1 including a mixer circuit and filter circuit means which modulate the dog's bark on the oscillator output and limit output to a specified frequency content.

7. The apparatus of claim 1 including a threshold detector means which rejects barks failing to meet a specified criterion as to time or amplitude, said means delaying the output of sound from said speaker for a specified interval.

8. The apparatus of claim 7 including a delay circuit means interposed in the signal path after said microphone.

9. The apparatus of claim 1 including a high pass filter set at about 20,000 hertz.

* * * * *